(12) United States Patent
Weinkötz et al.

(10) Patent No.: US 9,266,308 B2
(45) Date of Patent: Feb. 23, 2016

(54) LIGNOCELLULOSIC MATERIALS WITH EXPANDED PLASTICS PARTICLES PRESENT IN NONUNIFORM DISTRIBUTION IN THE CORE

(71) Applicant: BASF SE, Ludwigshafen (DE)

(72) Inventors: Stephan Weinkötz, Neustadt (DE); Michael Schmidt, Dudenhofen (DE); Michael Finkenauer, Worms (DE); Ralph Lunkwitz, Neustadt (DE)

(73) Assignee: BASF SE, Ludwigshafen (DE)

( * ) Notice: Subject to any disclaimer, the term of this patent is extended or adjusted under 35 U.S.C. 154(b) by 114 days.

(21) Appl. No.: 13/724,005

(22) Filed: Dec. 21, 2012

(65) Prior Publication Data

US 2013/0177757 A1     Jul. 11, 2013

Related U.S. Application Data

(60) Provisional application No. 61/579,673, filed on Dec. 23, 2011.

(51) Int. Cl.
*B32B 21/02*     (2006.01)
*C08L 97/02*     (2006.01)
*B32B 3/26*      (2006.01)

(52) U.S. Cl.
CPC . *B32B 21/02* (2013.01); *B32B 3/26* (2013.01); *C08L 97/02* (2013.01); *B32B 2264/0214* (2013.01); *B32B 2264/065* (2013.01); *B32B 2264/12* (2013.01); *B32B 2471/00* (2013.01); *B32B 2479/00* (2013.01); *Y10T 428/249972* (2015.04)

(58) Field of Classification Search
CPC .................................. B32B 21/02; B32B 3/26
USPC ........................................................ 264/113
See application file for complete search history.

(56) References Cited

U.S. PATENT DOCUMENTS

| | | | | |
|---|---|---|---|---|
| 3,274,046 | A * | 9/1966 | Shannon et al. | 428/86 |
| 5,112,875 | A | 5/1992 | Zimmermann et al. | |
| 2001/0017428 | A1 | 8/2001 | Klasterka | |
| 2006/0234019 | A1* | 10/2006 | Pohlmann | 428/198 |
| 2010/0297425 | A1* | 11/2010 | Gehringer et al. | 428/313.5 |
| 2011/0003136 | A1 | 1/2011 | Schmidt et al. | |
| 2011/0217550 | A1 | 9/2011 | Peretolchin et al. | |
| 2011/0217562 | A1 | 9/2011 | Peretolchin et al. | |
| 2012/0064355 | A1 | 3/2012 | Kasmayr et al. | |
| 2012/0141772 | A1 | 6/2012 | Braun et al. | |
| 2012/0202041 | A1 | 8/2012 | Kasmayr et al. | |

FOREIGN PATENT DOCUMENTS

| | | | |
|---|---|---|---|
| CA | 2286623 | A1 | 10/1998 |
| CH | 370229 | A | 6/1963 |
| DE | 1808349 | A1 | 5/1970 |
| DE | 19716130 | C1 | 1/1999 |
| DE | 202007017713 | U1 | 4/2008 |
| EP | 1140447 | A1 | 10/2001 |
| WO | WO-98/47677 | A1 | 10/1998 |
| WO | WO2008046890 | * | 4/2008 |
| WO | WO-2008046890 | A2 | 4/2008 |
| WO | WO2009037240 | * | 3/2009 |
| WO | WO2009050565 | * | 4/2009 |
| WO | WO-2010119431 | A2 | 10/2010 |
| WO | WO-2011018372 | A1 | 2/2011 |
| WO | WO-2011107365 | A1 | 9/2011 |
| WO | WO-2011107900 | A1 | 9/2011 |

OTHER PUBLICATIONS

U.S. Appl. No. 61/357,552.
U.S. Appl. No. 61/489,274.
U.S. Appl. No. 61/579,671.
Deppe, J., et al. "MDF: Mitteldichte Faserplatten" (1996) pp. 93-104.
Deppe, J., et al., "Taschenbuch der Spanplatten Technik" (2000) pp. 232-254.
Dunky, M., et al., "Holzwerkstoffe und Leime" (2002) pp. 91-157.
Dunky, M., et al., "Holzwerkstoffe und Leime" (2002) pp. 251-259.
Dunky, M., et al., "Holzwerkstoffe und Leime" (2002) pp. 265-269.
Dunky, M., et al., "Holzwerkstoffe und Leime" (2002) pp. 303-313.
Dunky, M., et al., "Holzwerkstoffe und Leime" (2002) pp. 341-352.
Kunststoff Handbuch (1988) pp. 12-40, Duroplaste 2.
Kunststoff Handbuch (1996) pp. 567-598 Polystyrol 4.
Kunststoff Handbuch (1996) pp. 640-673 Polystyrol 4.
Ullmanns Encyclopedia of Industrial Chemistry (1985) pp. 115-141 Amino Resins, vol. 2.

(Continued)

*Primary Examiner* — Matthew Daniels
(74) *Attorney, Agent, or Firm* — Drinker Biddle & Reath LLP

(57) ABSTRACT

The invention is directed to lignocellulosic materials having a core and two outer layers, containing in the core A) lignocellulose particles;

B) expanded plastics particles having a bulk density in the range from 10 to 150 kg/m$^3$, C) one or more binders selected from the group consisting of aminoplast resin, phenoplast resin, and organic isocyanate having at least two isocyanate groups, and D) optionally additives and in the outer layers E) lignocellulose particles, F) one or more binders selected from the group consisting of aminoplast resin, phenol-formaldehyde resin, and organic isocyanate having at least two isocyanate groups, and where the lignocellulose particles of the outer layers E comprise at least 25% by weight of lignocellulosic chips and the expanded plastics particles B are present in nonuniform distribution in the core.

12 Claims, No Drawings

(56) References Cited

OTHER PUBLICATIONS

Ullmanns Enzyklopadie der technischen Chemie (1973) pp. 403-424 Aminoplaste.

Zeppenfeld, G., et al., "Klebstoffe in der Holz- und Mobelindustrie" (2005) pp. 268-269.

International Search Report for PCT/EP2012/076310 dated Feb. 11, 2013.

International Search Report for PCT/EP2012/076310 mailed Feb. 11, 2013.

* cited by examiner

LIGNOCELLULOSIC MATERIALS WITH EXPANDED PLASTICS PARTICLES PRESENT IN NONUNIFORM DISTRIBUTION IN THE CORE

CROSS-REFERENCE TO RELATED APPLICATIONS

This application claims benefit (under 35 USC 119(e)) of U.S. Provisional Application 61/579,673, filed Dec. 23, 2011, which is incorporated by reference.

The present invention relates to lignocellulosic materials having a core and two outer layers, the core comprising expanded plastics particles in nonuniform distribution.

CH-A-370 229 discloses compression moldings which possess both light weight and compressive strength and which consist of wood chips or wood fibers, a binder, and a porous, foamable or partly foamable, plastic that serves as filler.

A disadvantage of these compression moldings is that they do not have plastics-free outer layers, meaning that customary coating technologies (e.g., lining with furniture foil or short-cycle coating with melamine films) lead to poor results.

DE-U-20 2007 017 713 discloses weight-reduced chipboard panels through combination of wood chips and evenly distributed foamed polystyrene beads in the middle ply of the panel.

A disadvantage of these materials is that the flexural strength, the screw pullout resistance and the surface quality are not sufficient for all applications.

WO-A-2008/046890 discloses lightweight, single-ply and multi-ply woodbase materials which comprise wood particles, a filler of polystyrene and/or styrene copolymer having improved transverse tensile strengths, a bulk density of 10 to 100 kg/m³, and binder. The filler is advantageously evenly distributed within the woodbase material.

A disadvantage of these materials is that an improvement in the properties for a given panel density is achievable only with an increase in the amount of glue and/or the amount of polymer and hence with an increase in the costs.

It was an object of the present invention, therefore, to remedy the disadvantages recited above, and more particularly to provide lightweight lignocellulosic materials having improved transverse tensile strengths, improved flexural strengths, improved screw pullout values and/or good surface properties, these materials continuing to possess good processing properties, like conventional high-density woodbase materials.

Found accordingly have been new and improved lignocellulosic materials having a core and two outer layers and comprising or, preferably, consisting of, in the core
A) 30% to 98% by weight of lignocellulose particles;
B) 1% to 25% by weight of expanded plastics particles having a bulk density in the range from 10 to 150 kg/m³,
C) 1% to 50% by weight of one or more binders selected from the group consisting of aminoplast resin, phenoplast resin, and organic isocyanate having at least two isocyanate groups, and
D) 0% to 10% by weight of additives
and in the outer layers
E) 70% to 99% by weight of lignocellulose particles,
F) 1% to 30% by weight of one or more binders selected from the group consisting of aminoplast resin, phenoplast resin, and organic isocyanate having at least two isocyanate groups, and
G) 0% to 10% by weight of additives,
wherein the lignocellulose particles of the outer layers E comprise at least 25% by weight of lignocellulosic chips and the expanded plastics particles B are present in nonuniform distribution in the core, and also processes for producing them, and their use.

The statement of the percent by weight of components A, B, C, D, E, F and G relates to the dry weight of the component in question as a proportion of the overall dry weight. The sum total of the percent by weight figures for components A, B, C and D is 100% by weight. The sum total of components E, F and G likewise makes 100% by weight. In addition, not only the outer layers but also the core comprise water, which is not taken into account in the weight figures. The water may originate from the residual moisture present in the lignocellulose particles, from the binder, from additionally added water, for dilution of the binders or for moistening of the outer layers, for example, or from the additives, such as aqueous curing agent solutions or aqueous paraffin emulsions, for example, or else from the expanded plastics particles when they are foamed, for example, using steam. The water content of the core and of the outer layers can be up to 20% by weight, i.e., 0% to 20% by weight, preferably 2% to 15% by weight, more preferably 4% to 10% by weight, based on 100% by weight overall dry weight. The ratio of the overall dry mass of the core to the overall dry mass of the outer layers is generally 100:1 to 0.25:1, preferably 10:1 to 0.5:1, more preferably 6:1 to 0.75:1, more particularly 4:1 to 1:1.

Expandable plastics particles B nonuniformly distributed in the core means that the weight ratio X (based on dry mass) of expanded plastics particles B to lignocellulose particles A in the outer regions of the core ("exterior") is different from the weight ratio Y of expanded plastics particles B to lignocellulose particles A in the inner region of the core ("interior"), in other words is greater or lesser in the outer regions of the core ("exterior") than in the inner region of the core ("interior"). The inner region of the core is generally separated from the two outer regions of the core by faces extending parallel to the panel plane. The inner region of the core is understood to be the region which comprises 20% to 80% by weight, preferably 30% to 70% by weight, more preferably 40% to 60% by weight, more particularly 45% to 55% by weight, very preferably 50% by weight of the overall dry mass of the core and is situated between the two outer regions. The two outer regions may have the same mass, in other words in each case 25% by weight, or approximately the same mass, i.e., 25.01:24.99% to 25.99:24.01% by weight, preferably 25.01:24.99% to 25.8:24.2%, more preferably 25.01:24.99% to 25.6:24.4%, more particularly 25.01:24.99% to 25.4:24.6%, or a different mass, based on the overall dry mass of the core, i.e., 26:24% to 40:10% by weight, preferably 26:24% to 30:20% by weight, more preferably 26:24% to 27:23% by weight, more particularly 26:24% to 26.5:23.5% by weight. The sum total of the inner region and of the two outer regions of the core makes up 100% by weight. For determining the weight ratio X of expanded plastics particles B to lignocellulose particles A in the outer regions of the core, it is possible to employ all expanded plastics particles B and all lignocellulose particles A which are present in both outer regions. The ratio X' here, which describes the ratio of plastics particles B to lignocellulose particles A in one of the two outer regions, may differ from or be the same as the ratio X", which describes the ratio in the other of the two outer regions.

The lignocellulosic materials (lignocellulose materials) of the invention can be produced as follows:

The components for the core and the components for the outer layers are mixed generally separately from one another.

For the core, the lignocellulose particles A may be mixed with the components B, C and D and/or with the component constituents comprised therein (i.e., two or more constituents, such as substances or compounds, for example, from the group of one component) in any desired order. Components A, B, C an D may in each case be composed of one, two (A1, A2 or B1, B2, or C1, C2 or D1, D2) or a plurality of component constituents (A1, A2, A3, . . . , or B1, B2, B3, . . . , C1, C2, C3, . . . , or D1, D2, D3, . . . ).

Where the components consist of a plurality of component constituents, these component constituents may be added either as a mixture or separately from one another. In the case of separate addition, these component constituents may be added directly after one another or else at different points in time not following directly on from one another. In the event, for example, that component C is composed of two constituents C1 and C2, this means that C2 is added immediately after C1 or C1 is added immediately after C2, or that one or more other components or component constituents, component B for example, are added between the addition of C1 and C2. It is also possible for components and/or component constituents to be premixed with other components or component constituents before being added. For example, an additive constituent D1 may be added to the binder C or to the binder constituent C1 before this mixture is then added to the actual mixture.

Preferably, first of all, the expanded plastics particles B are added to the lignocellulose particles A, and this mixture is thereafter admixed with a binder C or with two or more binder constituents C1, C2, etc. Where two or more binder constituents are used, they are preferably added separately from one another. The additives D are preferably partially mixed with the binder C or with a binder constituent (i.e., a plurality of constituents, such as substances or compounds, for example, from the group of the component) and then added.

For the outer layers, the lignocellulose particles E are mixed with the components F and G and/or with the component constituents present therein (i.e., a plurality of constituents, such as substances or compounds, for example, from the group of one component) in any desired order. For the two outer layers it is possible to use either the same mixture or two different mixtures, preferably the same mixture.

Where the components consist of a plurality of component constituents, these constituents can be added either as a mixture or separately from one another. In that case, these component constituents can be added directly after one another or else at different points in time not following directly on from one another. The additives G are preferably partially mixed with the binder F or a binder constituent and then added.

The resulting mixtures A, B, C, D and E, F, G are layered one on top another and compressed by a customary process, at elevated temperature, to give a lignocellulosic molding. For this purpose, a mat is produced on a support, said mat being composed of these mixtures in the order E, F, G/A, B, C, D/E, F, G ("sandwich construction"). This mat is compressed customarily at temperatures from 80 to 300° C., preferably 120 to 280° C., more preferably 150 to 250° C., and at pressures from 1 to 50 bar, preferably 3 to 40 bar, more preferably 5 to 30 bar, to form moldings. In one preferred embodiment, the mat is subjected to cold precompaction ahead of this hot-pressing. Compression may take place by any of the methods known to the skilled person (see examples in "Taschenbuch der Spanplatten Technik", H.-J. Deppe, K. Ernst, 4th edn., 2000, DRW-Verlag Weinbrenner, Leinfelden Echterdingen, pages 232 to 254, and "MDF-Mitteldichte Faserplatten" H.-J. Deppe, K. Ernst, 1996, DRW-Verlag Weinbrenner, Leinfelden-Echterdingen, pages 93 to 104). These methods use discontinuous pressing techniques, on single-stage or multi-stage presses, for example, or continuous pressing techniques, on double-belt presses, for example.

The nonuniform distribution of the plastics particles B in the core may be generated as follows:

A plurality of mixtures of components A, B, C and D can be produced, containing different mass ratios of components A and B. These mixtures can be scattered in succession. In this case, there ought generally to be only slight mixing, or none, of the mixtures with different mass ratios of components A and B. As a result, a nonuniform distribution of the expanded plastics particles in the core of the lignocellulose material can be achieved. In this context, both the wood particles A and the plastics particles B can be separated beforehand into different fractions, by screening, for example. Each of the mixtures may comprise different fractions of the wood particles A and/or of the plastics particles B.

In another embodiment, the nonuniform distribution of the plastics particles B in the core may be accomplished by separative scattering. In this case, scattering takes place using a means which ensures that the spheres accumulate either in the outer regions or in the inner regions of the core, depending on the size and/or on the weight. This can be accomplished, for example, by scattering the mixture A, B, C, D using a screening system. In one preferred embodiment, this system is equipped with screens of different hole sizes which are arranged mirror-symmetrically. With particular preference, a support bearing the material for the lower outer layer is conveyed beneath a scattering means in which a screen system is disposed in such a way that at the beginning of the scattering means (in production direction) there are screens with a small hole size, with the hole size of the screens increasing inwardly toward the middle of the scattering station, and decreasing again at the end of the station. The disposition of the screens means that small lignocellulose particles enter into the outer regions of the core, those close to the outer layer, and large lignocellulose particles enter the inner region of the core. At the same time, small plastics particles enter the outer regions of the core, those close to the outer layer, and large plastics particles enter the inner region of the core. Depending on the size distribution of the lignocellulose particles and of the plastics particles, this produces different mass ratios of lignocellulose particles A to plastics particles B. Scattering stations of this kind are described in EP-B-1140447 and DE-C-19716130.

For example, the lignocellulose particle scattering station may comprise two metering silos each housing a plurality of back-scraping rakes. The bulk material, composed of different large particles A and of components B, C and D ("core mixture"), can be supplied to the metering silos (e.g., from above). Disposed on the underside of each of the metering silos may be a bottom belt which runs over two deflecting rollers and which, in each case together with a discharge roll, forms a discharge unit for the core mixture. Beneath each of the discharge rolls there may be a continuous scraper belt which is guided over two deflecting rollers and whose lower tower can be guided in each case over screen devices with different hole sizes, thus forming different sections of the screen devices. Together with the scraper belts, the screen devices form fractionating means by which the lignocellulosic particles A and the plastics particles B of the core mixture can be fractionated according to their sizes. The sections of the screen devices may be disposed in such a way that the fine lignocellulose particles A and/or plastics particles B are each scattered, in those regions of the scattering station that lie externally in the transport direction of the web, onto the lower outer layer, while the coarse lignocellulose particles A and/or plastics particles B are scattered, via the internal regions of the fractionating means, onto the outer layer (see in detail EP-B-1140447).

According to another advantageous embodiment of the invention, at least a part of the apportioning sections in each case comprises an abrasive element which bears against the surface of the screen means and, when the apportioning sections are moved, is guided abradingly over the surface of the screen means. An abrasive element bearing under gentle pressure against the surface of the screen means for each apportioning section or at least some of the apportioning sections further strengthens the cleaning effect which comes about when the apportioning sections are moved over the surface of the screen means. At the same time, the abrasive elements reinforce the force component that acts on the particles in a direction perpendicular to the screen surface, thereby producing an increase in the throughput. The transport means is preferably designed as a scraper belt, more particularly as a continuous scraper belt. In this way, particularly simple and inexpensive configuration of the transport means is possible. Here, advantageously, the scraper belt is formed perviously for the particles at least over a subregion in a direction perpendicular to the surface of the screen means, thereby allowing the particles to be tipped from the metering silo via its feed unit through the scraper belt and onto the screen means. This does away with the need for any complicated configuration of the feed unit. According to a further advantageous embodiment of the invention, the scraper belt comprises drivers, more particularly platelike drivers, which are provided preferably at regular intervals on a continuous support element in chain or belt form. In this case, the support element may be mounted in each case centrally on the drivers. It is also possible, however, for a plurality of support elements, more particularly two chain or belt support elements, to be provided, each fastened in the region of the lateral outside edges of the drivers. This increases the stability of a scraper belt designed in accordance with the invention. Preferably, the drivers are fastened detachably on the support element or support elements, and/or are of air-impervious design. This ensures that, on the one hand, the drivers used can be optimally tailored to the screen means employed, and on the other hand that worn drivers can be replaced by new ones. According to another advantageous embodiment of the invention, the abrasive elements are formed in each case by a section of the drivers. In this way, the design of the means of the invention can be particularly cost-effective, since no separate components are needed for the abrasive elements. In particular, at least in their sections forming the abrasive elements, the drivers are of flexible design, being made from hard rubber, for example. This allows the abrasive elements to conform to the surface of the screen means, thereby ensuring, even in the event of a certain irregularity in the screen surface, that the abrasive elements bear on the surface of the screen means with a certain pressure over their entire width and also over their entire range of movement. According to another preferred embodiment of the invention, the drivers are of abrasion-resistant design, at least in their sections forming the abrasive elements, and more particularly possess an abrasion-resistant coating, such as a Teflon coating, for example. The sections of the drivers that form the abrasive elements may be designed either in one piece with the drivers or else as separate components. Where the abrasive elements are designed as separate components, they are preferably mounted detachably on the drivers, so that they can be replaced in the event of wear. According to another advantageous embodiment of the invention, the drivers, at least in their sections forming the abrasive elements, are formed from water-repellent nonadhering material. This prevents the particles wetted with binder remaining stuck to the drivers, which could limit the pickup capacity of the apportioning sections. According to a further preferred embodiment of the invention, the screen means comprises screen zones, more particularly two screen zones, with different screen openings. In this way, particles of different size are fractionated by the screen zones with different-sized screen openings. In this context, in particular, the screen zones are arranged one after another along the direction of movement of the apportioning sections that are movable over the surface of the screen means, and preferably the screen openings of the screen zone/zones situated in the direction of movement of the apportioning sections are larger than the screen openings of the screen zone/screen zones situated counter to the direction of movement. This ensures that, as they pass over the screen surface, the particles with small diameter pass first through the screen means, while in the next screen zone, after this, the next-larger particles pass through the screen. Depending on the number of screen zones and on the size of the screen openings, therefore, the desired fractioning of the particles is achieved. These fractionated particles may either be tipped, in accordance with the screen zones, into different collecting means for the different particle sizes, or, for example, may be tipped onto a moving conveyor belt which is disposed beneath the screen means and on which, in this way, a web with different distributions of particle sizes over its thickness can be produced.

According to a further advantageous embodiment of the invention, the continuous scraper belt is guided via two deflection rolls, and so a lower belt section runs directly on the surface of the screen means, and an upper belt section runs at a particular distance from the surface of the screen means, more particularly in each case substantially parallel to the surface of the screen means. In this way, a particularly compact design is possible for a means of the invention. Preferably in this case, at least at one end of the scraper belt, more particularly in the region of the deflection rolls, there is a pickup means provided for picking up expelled particles. These particles may be alien bodies present in the bulk material, such as screws or nails, for example; alternatively, they may be aggregations or particles which exceed a maximum permissible size, and which are expelled and taken away in order that even the largest screen openings of the screen means cannot become clogged. According to another preferred embodiment of the invention, at least in regions between the upper and lower belt sections, an intermediate base is provided, and the drivers bear, with their ends opposed to the sections forming the abrasive elements, against the intermediate base, meaning that, when the apportioning sections are moved, these ends are guided abradingly over the intermediate base. With this embodiment, bulk material applied from the metering silo via its feed unit initially to the intermediate base can be brought in a defined way to a particular position between the deflection rollers. In this case, according to one preferred embodiment, the intermediate base may extend from one deflection roller in the direction of movement of the upper belt section toward the opposite, other deflection roller; between this other deflection roller and the end of the intermediate base that faces this other deflection roller, a region is formed which is pervious for the particles in a direction perpendicular to the surface of the screen means. Particularly when this region is formed from further screen means possessing relatively large screen openings, it is possible here for there to be a preliminary deposition of alien bodies or particles having a size which is above the size of these screen openings. Only those particles that pass through the further screen means fall onto the underlying screen means, over which they are moved by means of the transport means. According to another preferred embodiment of the invention, there are two scraper belts situated one after the other in the longitudinal direction, and the scraper belts are in particular arranged mirror-symmetrically to one another. In this case, advantageously, a distribution means, more particularly in the form of a shuttle distributor, is positioned downstream of the feed unit of the metering silo, and can be used to supply the particles taken from the metering silo through the feed unit to the two scraper belts, more particularly in alternation. By means of this design it is possible, starting from one metering silo, to distribute particles to two different scraper belts. Especially when the two scraper belts can be driven in opposing directions, and so the two upper belt sections can be moved in a mutually divergent way, and, between the upper and the lower belt sections, in a manner already described, an intermediate base is provided, it is possible for the particles applied via the distribution means to the respective intermediate bases to be transported to the ends of the scraper belts that are situated in opposite directions, where they are applied in each case to the screen means disposed beneath the scraper belts. Given appropriate sizing of the screen openings of these screen means, particularly when the size of the screen openings increases in the direction of movement of the lower belt sections, the material for the core can be formed on a moving conveyor belt disposed beneath the screen means, and on which the lower outer layer has already been scattered, the formation of the core material being such that the fine lignocellulose particles A and/or plastics particles B are accumulated in the outer layers of the core, and the coarse lignocellulose particles A and/or plastics particles B are accumulated in the inner layer of the core. Instead of a distribution means, it is also possible, for example, for there to be two metering silos by which the two scraper belts are charged with particles. In all embodiments, the screen means and/or the further screen means is preferably designed as an oscillating screen or as a vibrating shaker screen. In this case, the bulk material fed to the screen means is loosened further, meaning that fine particles and, subsequently, medium-sized particles at a distance from the screen pass more quickly toward the screen openings and through them (see in detail DE-C-197 16 130).

Another preferred embodiment is the use of a roller scattering system with specially profiled rolls (roll screen). In this case as well, preferably, a symmetrical construction is selected, meaning that small lignocellulose particles A and/or small plastics particles B enter the outer regions of the core, those close to the outer layer, and large lignocellulose particles A and/or large plastics particles B enter the inner region of the core. One particularly preferred embodiment is the use of one or more ClassiFormer™ devices. Suitability is possessed, for example, by the Classiformer CC from Dieffenbacher, which has a symmetrical construction. Alternatively it is possible to use two Classiformers C, arranged opposite and one after the other.

The lignocellulose materials of the invention generally have an average density of 300 to 600 kg/m³, preferably 350 to 590 kg/m³, more preferably 400 to 570 kg/m³, more particularly 450 to 550 kg/m³.

The lignocellulose particles of component A are present in the lignocellulosic materials of the core in amounts from 30% to 98% by weight, preferably 50% to 95% by weight, more preferably 70% to 90% by weight, and their base material is any desired wood variety or mixtures thereof, examples being spruce, beech, pine, larch, lime, poplar, eucalyptus, ash, chestnut and fir wood or mixtures thereof, preferably spruce, beech or mixtures thereof, more particularly spruce, and may comprise, for example, wood parts such as wood laths, wood strips, wood chips, wood fibers, wood dust or mixtures thereof, preferably wood chips, wood fibers, wood dust and mixtures thereof, more preferably wood chips, wood fibers or mixtures thereof—of the kind used for producing chipboard, MDF (medium-density fiberboard) and HDF (high-density fiberboard) panels. The lignocellulose particles may also come from woody plants such as flax, hemp, cereals or other annual plants, preferably from flax or hemp. Particular preference is given to using wood chips of the kind used in manufacturing chipboard. Where mixtures of different lignocellulose particles are used, such as mixtures of wood chips and wood fibers, or of wood chips and wood dust, for example, the fraction of wood chips is preferably at least 75% by weight, in other words 75% to 100% by weight, more preferably at least 90% by weight, in other words 90% to 100% by weight. The average density of component A is generally 0.4 to 0.85 g/cm³, preferably 0.4 to 0.75 g/cm³, more particularly 0.4 to 0.6 g/cm³.

Starting materials for lignocellulose particles are customarily roundwoods, lumber from forestry thinning, residual lumber, waste forest lumber, residual industrial lumber, used lumber, production waste from the production of woodbase materials, used woodbase materials, and also lignocellulosic plants. Processing to the desired lignocellulosic particles, to wood particles for example, such as wood chips or wood fibers, may take place in accordance with known methods (e.g., M. Dunky, P. Niemz, Holzwerkstoffe and Leime, pages 91 to 156, Springer Verlag Heidelberg, 2002).

In the outer layers, the lignocellulose particles are present in amounts of from 70% to 99% by weight, preferably 75% to 97% by weight, more preferably 80% to 95% by weight. They consist of at least 25% by weight, in other words 25% to 100% by weight, of lignocellulosic chips, more particularly wood chips, preferably at least 75% by weight, in other words 75% to 100% by weight, more preferably at least 95% by weight, in other words 95% to 100% by weight, and very preferably exclusively, in other words 100% by weight of, lignocellulosic chips are used, more particularly wood chips. Raw materials used may be lignocellulosic materials, in particular wood from all lignocellulose or wood sources listed under component A. Preparation to give the desired lignocellulosic particles may take place as described for component A. The average density of component E is generally 0.4 to 0.85 g/cm³, preferably 0.4 to 0.75 g/cm³, more particularly 0.4 to 0.6 g/cm³.

Component A may comprise the customary small amounts of water, from 0% to 10% by weight, preferably 0.5% to 8% by weight, more preferably 1% to 5% by weight (in a customary low range of fluctuation of 0% to 0.5% by weight, preferably 0% to 0.4% by weight, more preferably 0% to 0.3% by weight). This quantity figure is based on 100% by weight of absolutely dry wood substance, and describes the water content of component A after the drying (by customary methods known to the skilled person) immediately prior to mixing with the first component or with the first component constituent or with the first mixture selected from B, C and D.

In one preferred embodiment, component E may comprise small amounts of water from 0% to 10% by weight, preferably 0.5% to 8% by weight, more preferably 1% to 5% by weight (in a customary low range of fluctuation of 0% to 0.5% by weight, preferably 0% to 0.4% by weight, more preferably 0% to 0.3% by weight). This quantity figure is based on 100% by weight of absolutely dry wood substance, and describes the water content of component E after the drying (by customary methods known to the skilled person) immediately prior to mixing with the first component or component constituent or mixture selected from F and G.

Suitable expanded plastics particles (component B) include expanded plastics particles, preferably expanded thermoplastics particles, having a bulk density from 10 to 150 kg/m$^3$, preferably 30 to 130 kg/m$^3$, more preferably 35 to 110 kg/m$^3$, more particularly 40 to 100 kg/m$^3$ (determined by weighing a defined volume filled with the bulk material).

Expanded plastics particles B are used generally in the form of spheres or beads having an average diameter of 0.01 to 50 mm, preferably 0.25 to 10 mm, more preferably 0.4 to 8.5 mm, more particularly 0.4 to 7 mm. In one preferred embodiment the spheres have a small surface area per unit volume, in the form of a spherical or elliptical particle, for example, and advantageously are closed-cell spheres. The open-cell proportion according to DIN ISO 4590 is generally not more than 30%, i.e., 0% to 30%, preferably 1% to 25%, more preferably 5% to 15%.

Suitable polymers on which the expandable or expanded plastics particles are based are generally all known polymers or mixtures thereof, preferably thermoplastic polymers or mixtures thereof, which can be foamed. Examples of highly suitable such polymers include polyketones, polysulfones, polyoxymethylene, PVC (rigid and flexible), polycarbonates, polyisocyanurates, polycarbodiimides, polyacrylimides and polymethacrylimides, polyamides, polyurethanes, aminoplast resins and phenolic resins, styrene homopolymers (also referred to below as "polystyrene" or "styrene polymer"), styrene copolymers, $C_2$-$C_{10}$ olefin homopolymers, $C_2$-$C_{10}$ olefin copolymers, and polyesters. For producing the stated olefin polymers it is preferred to use the 1-alkenes, examples being ethylene, propylene, 1-butene, 1-hexene and 1-octene.

The polymers, preferably the thermoplastics, may additionally be admixed with the customary additives forming a basis for the expandable or expanded plastics particles B), examples being UV stabilizers, antioxidants, coating materials, hydrophobing agents, nucleators, plasticizers, flame retardants, soluble and insoluble, organic and/or inorganic dyes, pigments, and athermanous particles, such as carbon black, graphite or aluminum powder, together or spatially separate, as adjuvants.

Component B may customarily be obtained as follows:

Suitable polymers, using an expansion-capable medium (also called "blowing agent") or comprising an expansion-capable medium, can be expanded by exposure to microwave energy, thermal energy, hot air, preferably steam, and/or to a change in pressure (this expansion often also being referred to as "foaming") (Kunststoff Handbuch 1996, volume 4, "Polystyrol", Hanser 1996, pages 640 to 673 or U.S. Pat. No. 5,112,875). In the course of this procedure, generally, the blowing agent expands, the particles increase in size, and cell structures are formed. This expanding can be carried out in customary foaming apparatus, often referred to as "prefoamers". Such prefoamers may be installed permanently or else may be portable. Expanding can be carried out in one or more stages. In the one-stage process, in general, the expandable plastics particles are expanded directly to the desired final size. In the multistage process, in general, the expandable plastics particles are first expanded to an intermediate size and then, in one or more further stages, are expanded via a corresponding number of intermediate sizes to the desired final size. The compact plastics particles identified above, also referred to herein as "expandable plastics particles", generally have no cell structures, in contrast to the expanded plastics particles. The expanded plastics particles generally have a low residual blowing agent content, of 0% to 5% by weight, preferably 0.5% to 4% by weight, more preferably 1% to 3% by weight, based on the overall mass of plastic and blowing agent. The expanded plastics particles obtained in this way can be placed in interim storage or used further without other intermediate steps for producing component B of the invention.

The expandable plastics particles can be expanded using all of the blowing agents known to the skilled person, examples being aliphatic $C_3$ to $C_{10}$ hydrocarbons, such as propane, n-butane, isobutane, n-pentane, isopentane, neopentane, cyclopentane and/or hexane and isomers thereof, alcohols, ketones, esters, ethers or halogenated hydrocarbons, preferably n-pentane, isopentane, neopentane and cyclopentane, more preferably a commercial pentane isomer mixture of n-pentane and isopentane.

The amount of blowing agent in the expandable plastics particles is generally in the range from 0.01% to 7% by weight, preferably 0.01% to 4% by weight, more preferably 0.1% to 4% by weight, based in each case on the expandable plastics particles containing blowing agent.

One preferred embodiment uses styrene homopolymer (also called simply "polystyrene" herein), styrene copolymer or mixtures thereof as the sole plastic in component B.

Polystyrene and/or styrene copolymer of this kind may be prepared by any of the polymerization techniques known to the skilled person; see, for example, Ullmann's Encyclopedia, Sixth Edition, 2000 Electronic Release or Kunststoff-Handbuch 1996, volume 4 "Polystyrol", pages 567 to 598.

The expandable polystyrene and/or styrene copolymer is generally prepared in a conventional way by suspension polymerization or by means of extrusion processes.

In the case of the suspension polymerization, styrene, optionally with addition of further comonomers, can be polymerized in aqueous suspension in the presence of a customary suspension stabilizer by means of radical-forming catalysts. The blowing agent and optionally other customary adjuvants may be included in the initial charge for the polymerization or else added to the batch in the course of the polymerization or after the polymerization has ended. The resultant beadlike, expandable styrene polymers impregnated with blowing agent, after the end of the polymerization, can be separated from the aqueous phase, washed, dried and screened.

In the case of the extrusion process, the blowing agent can be mixed into the polymer via an extruder, for example, conveyed through a die plate and pelletized under pressure to form particles or strands.

The preferred or particularly preferred expandable styrene polymers or expandable styrene copolymers described above have a relatively low blowing agent content. Such polymers are also referred to as "low in blowing agent". A highly suitable process for producing expandable polystyrene or expandable styrene copolymer low in blowing agent is described in U.S. Pat. No. 5,112,875, hereby incorporated by reference.

As described, it is also possible to use styrene copolymers. Advantageously, these styrene copolymers contain at least 50% by weight, i.e., 50% to 100% by weight, preferably at least 80% by weight, i.e., 80% to 100% by weight, of copolymerized styrene, based on the mass of the plastic (without blowing agent). Examples of comonomers contemplated include α-methylstyrene, ring-halogenated styrenes, acrylonitrile, esters of acrylic or methacrylic acid with alcohols having 1 to 8 C atoms, N-vinylcarbazole, maleic acid, maleic anhydride, (meth)acrylamides and/or vinyl acetate.

The polystyrene and/or styrene copolymer may advantageously include a small amount of a copolymerized chain-branching agent, in other words a compound having more than one double bond, preferably two double bonds, such as divinylbenzene, butadiene and/or butanediol diacrylate. The branching agent is used generally in amounts from 0.0005 to 0.5 mol %, based on styrene. Mixtures of different styrene (co)polymers can be used as well. Highly suitable styrene homopolymers or styrene copolymers are crystal-clear polystyrene (GPPS), high-impact polystyrene (HIPS), anionically polymerized polystyrene or high-impact polystyrene (A-IPS), styrene-α-methylstyrene copolymers, acrylonitrile-butadiene-styrene polymers (ABS), styrene-acrylonitrile (SAN), acrylonitrile-styrene-acrylic ester (ASA), methyl acrylate-butadiene-styrene (MBS), methyl methacrylate-acrylonitrile-butadiene-styrene (MABS) polymers or mixtures thereof, or used with polyphenylene ether (PPE).

Preference is given to using plastics particles, more preferably styrene polymers or styrene copolymers, more particularly styrene homopolymers, having a molecular weight in the range from 70000 to 400000 g/mol, more preferably 190000 to 400000 g/mol, very preferably 210000 to 400000 g/mol.

These expanded polystyrene particles or expanded styrene copolymer particles may be used, with or without further measures for blowing agent reduction, for producing the lignocellulosic substance.

The expandable polystyrene or expandable styrene copolymer or the expanded polystyrene or expanded styrene copolymer customarily has an antistatic coating.

The expanded plastics particles B are generally in an unmelted state even after compression to form the lignocellulose material, this meaning that the plastics particles B have generally not penetrated or impregnated the lignocellulose particles, but instead are distributed between the lignocellulose particles. The plastics particles B can customarily be separated from the lignocellulose by physical methods, as for example after the comminuting of the lignocellulose material.

The overall amount of the expanded plastics particles B, based on the overall dry mass of the core, is generally in the range from 1% to 25% by weight, preferably 3% to 20% by weight, more preferably 5% to 15% by weight.

It has emerged as being advantageous to match the dimensions of the above-described expanded plastics particles B to the lignocellulose particles, preferably wood particles A), or vice versa.

This matching is expressed below by the relationship of the respective d' values (from the Rosin-Rammler-Sperling-Bennet function) of the lignocellulose particles, preferably wood particles A, and of the expanded plastics particles B.

The Rosin-Rammler-Sperling-Bennet function is described in DIN 66145, for example.

The d' values are determined by conducting sieve analyses first of all for determining the particle size distribution of the expanded plastics particles B and lignocellulose particles, preferably wood particles, A, in analogy to DIN 66165, Parts 1 and 2.

The values from the sieve analysis are then inserted into the Rosin-Rammler-Sperling-Bennet function, and d' is calculated.

The Rosin-Rammler-Sperling-Bennet function is:

$$R=100*\exp(-(d/d')^n))$$

The definitions of the parameters are as follows:
R residue (% by weight) remaining on the respective sieve tray
d particle size
d' particle size at 36.8% by weight of residue
n width of the particle size distribution Highly suitable lignocellulose particles A, preferably wood particles, have a d' value according to Rosin-Rammler-Sperling-Bennet (definition and determination of the d' value as described above) in the range from 0.1 to 5, preferably 0.3 to 3, and more preferably 0.5 to 2.75.

Highly suitable lignocellulose materials are obtained when the d' values according to Rosin-Rammler-Sperling-Bennet of the lignocellulose particles, preferably wood particles A and for the particles of the expanded plastics particles B are subject to the following relationship:
d' of the particles A≤2.5×d' of the particles B, preferably
d' of the particles A≤2.0×d' of the particles B, more preferably
d' of the particles A≤1.5×d' of the particles B, very preferably
d' of the particles A≤d' of the particles B.

The overall amount of the binder C, based on the overall mass of the core, is in the range from 1% to 50% by weight, preferably 2% to 15% by weight, more preferably 3% to 10% by weight.

The overall amount of the binder F, based on the overall dry mass of the outer layer(s), is in the range from 1% to 30% by weight, preferably 2% to 20% by weight, more preferably 3% to 15% by weight.

The binders of component C and of component F may be selected from the group consisting of aminoplast resin, phenoplast resin, and organic isocyanate having at least two isocyanate groups, using identical or different binders or binder mixtures of components C and F, preferably identical binders, with particular preference aminoplast in both cases. The weight figure in the case of aminoplasts or phenoplasts relates to the solids content of the corresponding component (determined by evaporating the water at 120° C. over the course of 2 hours in accordance with Günter Zeppenfeld, Dirk Grunwald, Klebstoffe in der Holz-und Möbelindustrie, $2^{nd}$ edition, DRW-Verlag, page 268), while in relation to the isocyanate, more particularly the PMDI (polymeric diphenylmethane diisocyanate), it relates to the isocyanate component per se, in other words, for example, without solvent or emulsifying medium.

Phenoplasts are synthetic resins which are obtained by condensing phenols with aldehydes and which may optionally be modified. In addition to unsubstituted phenol, phenol derivatives as well can be used for preparing phenoplasts. These derivatives may be cresols, xylenols or other alkylphenols, as for example p-tert-butylphenol, p-tert-octylphenol, and p-tert-nonylphenol, arylphenols, as for example phenylphenol and naphthols, or divalent phenols, examples being resorcinol and bisphenol A. The most important aldehyde for the preparation of phenoplasts is formaldehyde, which can be used in a variety of forms—for example, as an aqueous solution, or in solid form, as para-formaldehyde, or as a formaldehyde donor. Other aldehydes, as for example acetaldehyde, acrolein, benzaldehyde or furfural, and ketones, may also be used. Phenoplasts can be modified by chemical reactions of the methylol groups or of the phenolic hydroxyl groups, and/or by physical dispersion in a modifying agent (EN ISO 10082).

Preferred phenoplasts are phenol-aldehyde resins, particularly preferably phenol-formaldehyde resins (also called PF resins) are known from, for example, Kunststoff-Handbuch, $2^{nd}$ edition, Hanser 1988, volume 10, "Duroplaste", pages 12 to 40.

As aminoplast resin it is possible to use all aminoplast resins known to the skilled person, preferably those known for the production of woodbase materials. Resins of this kind and also their preparation are described in, for example, Ullmanns Enzyklopädie der technischen Chemie, 4th, revised and expanded edition, Verlag Chemie, 1973, pages 403 to 424 "Aminoplaste", and Ullmann's Encyclopedia of Industrial Chemistry, vol. A2, VCH Verlagsgesellschaft, 1985, pages 115 to 141 "Amino Resins", and also in M. Dunky, P. Niemz, Holzwerkstoffe und Leime, Springer 2002, pages 251 to 259 (UF resins) and pages 303 to 313 (MUF and UF with a small amount of melamine). Generally speaking, they are polycondensation products of compounds having at least one—optionally substituted partially with organic radicals—amino group or carbamide group (the carbamide group is also called carboxamide group), preferably carbamide group, preferably urea or melamine, and an aldehyde, preferably formaldehyde. Preferred polycondensation products are urea-formaldehyde resins (UF resins), melamine-formaldehyde resins (MF resins) or melamine-containing urea-formaldehyde resins (MUF resins), more preferably urea-formaldehyde resins, examples being Kaurit® glue products from BASF SE.

Particularly preferred polycondensation products are those in which the molar ratio of aldehyde to the—optionally substituted partially with organic radicals—amino group and/or carbamide group is in the range from 0.3:1 to 1:1, preferably 0.3:1 to 0.6:1, more preferably 0.3:1 to 0.55:1, very preferably 0.3:1 to 0.5:1. Where the aminoplasts are used in combination with isocyanates, the molar ratio of aldehyde to the—optionally substituted partially with organic radicals—amino group and/or carbamide group is in the range from 0.3:1 to 1:1, preferably 0.3:1 to 0.6:1, more preferably 0.3:1 to 0.45:1, very preferably 0.3:1 to 0.4:1.

The stated aminoplast resins are used customarily in liquid form, usually in solution, customarily as a 25% to 90% by weight strength solution, preferably a 50% to 70% by weight strength solution, preferably in aqueous solution, but may also be used in solid form.

The solids content of the liquid aqueous aminoplast resin can be determined in accordance with Günter Zeppenfeld, Dirk Grunwald, Klebstoffe in der Holz-und Möbelindustrie, $2^{nd}$ edition, DRW-Verlag, page 268.

The constituents of the binder C and of the binder F can be used per se alone—that is, for example, aminoplast resin or organic isocyanate or PF resin as sole constituent of binder C or of binder F. In addition, however, the resin constituents of binder C and of binder F may also be used as a combination of two or more constituents of the binder C and/or of the binder F; these combinations preferably comprise an aminoplast resin and/or phenoplast resin.

In one preferred embodiment a combination of aminoplast and isocyanate can be used as binder C. In this case, the total amount of the aminoplast resin in the binder C, based on the overall dry mass of the core, is in the range from 1% to 45% by weight, preferably 4% to 14% by weight, more preferably 6% to 9% by weight. The overall amount of the organic isocyanate, preferably of the oligomeric isocyanate having 2 to 10, preferably 2 to 8 monomer units and on average at least one isocyanate group per monomer unit, more preferably PMDI, in the binder C, based on the overall dry mass of the core, is in the range from 0.05% to 5% by weight, preferably 0.1% to 3.5% by weight, more preferably 0.5% to 1.5% by weight.

Components D and G may each independently of one another comprise different or identical, preferably identical curing agents that are known to the skilled person, or mixtures thereof. These components are customarily used if the binder C and/or F comprises aminoplasts or phenoplast resins. These curing agents are preferably added to the binder C and/or F, in the range, for example, from 0.01% to 10% by weight, preferably 0.05% to 5% by weight, more preferably 0.1% to 3% by weight, based on the overall amount of aminoplast resin or phenoplast resin.

Curing agents for the aminoplast resin component or for the phenoplast resin component are understood herein to encompass all chemical compounds of any molecular weight that accelerate or bring about the polycondensation of aminoplast resin or phenol-formaldehyde resin. One highly suitable group of curing agents for aminoplast resin or phenoplast resin are organic acids, inorganic acids, acidic salts of organic acids, and acidic salts of inorganic acids, or acid-forming salts such as ammonium salts or acidic salts of organic amines. The components of this group can of course also be used in mixtures. Examples are ammonium sulfate or ammonium nitrate or organic or inorganic acids, as for example sulfuric acid, formic acid or acid-regenerating substances, such as aluminum chloride, aluminum sulfate or mixtures thereof. One preferred group of curing agents for aminoplast resin or phenoplast resin are organic or inorganic acids such as nitric acid, sulfuric acid, formic acid, acetic acid, and polymers with acid groups, such as homopolymers or copolymers of acrylic acid or methacrylic acid or maleic acid.

Phenoplast resins, preferably phenol-formaldehyde resins, can also be cured alkylenically. It is preferred to use carbonates or hydroxides such as potassium carbonate and sodium hydroxide.

Further examples of curing agents for aminoplast resins are known from M. Dunky, P. Niemz, Holzwerkstoffe und Leime, Springer 2002, pages 265 to 269, and further examples of curing agents for phenoplast resins, preferably phenol-formaldehyde resins, are known from M. Dunky, P. Niemz, Holzwerkstoffe und Leime, Springer 2002, pages 341 to 352.

The lignocellulose materials of the invention may comprise further, commercially customary additives and additives known to the skilled person, as component D and as component G, independently of one another identical or different, preferably identical additives, in amounts from 0% to 10% by weight, preferably 0.5% to 5% by weight, more preferably 1% to 3% by weight, examples being hydrophobizing agents such as paraffin emulsions, antifungal agents, formaldehyde scavengers, such as urea or polyamines, for example, and flame retardants.

In the material of the invention, the ratio Z between the weight ratio X of expanded plastics particles to lignocellulose particles in the outer regions of the core ("exterior") and the weight ratio Y of expanded plastics particles to lignocellulose particles in the inner region of the core ("interior") is 1.05:1 to 1000:1, preferably 1.1:1 to 500:1, more preferably 1.2:1 to 200:1. In a further preferred embodiment, this ratio Z is 0.001:1 to 0.95:1, preferably 0.002:1 to 0.9:1, more preferably 0.005:1 to 0.8:1.

The thickness of the lignocellulose materials of the invention with expanded plastics particles present in nonuniform distribution in the core varies with the field of application and is situated in general in the range from 0.5 to 100 mm, preferably in the range from 10 to 40 mm, more particularly 15 to 20 mm.

Lignocellulose materials, as for example woodbase materials, are an inexpensive and resource-protecting alternative to solid wood, and have become very important particularly in furniture construction, for laminate floors and as construction materials. Customarily serving as starting materials are wood particles of different thicknesses, examples being wood chips or wood fibers from a variety of woods. Such wood particles are customarily compressed with natural and/or synthetic binders and optionally with addition of further additives to form woodbase materials in panel or strand forms.

Lightweight woodbase materials are very important for the following reasons:

Lightweight woodbase materials lead to greater ease of handling of the products by the end customers, as for example when packing, transporting, unpacking or constructing the furniture.

Lightweight woodbase materials result in lower costs for transport and packaging, and it is also possible to save on materials costs when producing lightweight woodbase materials.

Lightweight woodbase materials may, as when used in means of transport, for example, result in a lower energy consumption by those means of transport. Furthermore, using lightweight woodbase materials, it is possible to carry out more cost-effective production of, for example, materials-intensive decorative parts, relatively thick worktops and side panels in kitchens.

There are numerous applications, as for example in the bathroom or kitchen furniture segment or in interior outfitting, where lightweight and economic lignocellulosic materials having improved mechanical properties, as for example improved flexural strengths, are sought after. Moreover, such materials are to have an extremely good surface quality, in order to allow application of coatings, for example a paint or varnish finish, having good properties.

EXAMPLES

1. Production of the Expanded Plastics Particles

The starting material used was the expandable polystyrene Kaurit® Light 200 from BASF SE. The polystyrene particles were treated with steam in a batch preliminary foamer, and were foamed to a bulk density of 50 g/l. The resultant expanded plastics particles (component B) were stored in an air-permeable fabric bag at room temperature for 7 days before further use.

2. Production of the Woodbase Materials

For each woodbase material board, three different mixtures of the starting materials were prepared.

Mixture 1: components E, F, G for the outer layers
Mixture 2: components A, B, C, D for the outer region of the core
Mixture 3: components A, B, C, D for the inner region of the core For comparative example 1, there is no component B—in other words, mixtures 2 and 3 in that case contain only components A, C and D.

The mixtures were each prepared in a laboratory mixer, with the solid constituents first being introduced and mixed. The liquid constituents were premixed in a vessel and then sprayed on through nozzles.

Spruce chips with a moisture content of 3.5% were used (components A and E). The binder used was Kaurit® Leim 347 size with a solids content of 67%, from BASF SE (components C and F). For mixture 1, the size was admixed with 10 parts by weight of water and 1 part by weight of 52% strength ammonium nitrate solution (based in each case on 100 parts by weight of Kaurit® Leim 347 size) before the size was applied to the solid constituents of the mixture. For mixtures 2 and 3, the size was admixed with 4 parts by weight of 52% strength ammonium nitrate solution (based on 100 parts by weight of Kaurit® Leim 347 size) before the size was applied to the solid constituents of the mixtures. The amount of size liquor is made such as to produce a degree of sizing of 8.5%, in other words 8.5 parts by weight of size (based on solids) per 100 parts by weight of E (based on solids) in mixture 1 and 8.5 parts by weight of size (based on solids) per 100 parts by weight of the mixture of A and B (based on solids) in mixtures 2 and 3.

The mixtures were then placed one above another in layers in a 30×30 cm mold in such a way as to produce, in a symmetrical construction, a cake of chips with 5 layers (sequence: mixture 1, mixture 2, mixture 3, mixture 2, mixture 1). The amounts here were selected such that the weight ratio of the layers (based on dry mass) was in each case 12.5:18.8:37.5:18.8:12.5.

In examples 2 to 8, the mass ratio of the total amount of component B present in the inner three layers to the total amount of component A present in the inner three layers is the same (based on solid substance.

The total weight of the woodbase material mat was selected so as to result in the desired density at a target thickness of 16 mm at the end of the pressing operation.

After this, the cake of chips was subjected to cold preliminary compressing and then pressed in a hot press. A thickness of 16 mm was set. The pressing temperature was 210° C. in each case, and the pressing time 150 s.

3. Investigation of the Woodbase Materials 3.1 Density
The density was determined 24 hours after production, in accordance with EN 1058.
3.2 Transverse Tensile Strength
The transverse tensile strength was determined in accordance with EN 319.
3.3 Flexural Strength and Flexural Elasticity Modulus
The flexural strength and flexural elasticity modulus were determined in accordance with DIN EN 310.
3.4 Screw Pullout Resistance
The screw pullout resistance was determined in accordance with DIN EN 320. Only the screw pullout resistances for the surfaces were measured.
3.5 Peeling Strength
The peeling strength, as a measure of the surface quality, was determined in accordance with DIN EN 311.

EXAMPLES

Examples 1 and 2

Comparative Examples without Expanded Plastics Particles or with Homogeneous Distribution of the Plastics Particles in the Core Examples 3 to 8: Inventive Examples

| Example | Ratio X ("exterior") | Ratio Y ("interior") | Ratio Z (=X:Y) | Density [kg/m$^3$] | Transverse tensile strength [N/mm$^2$] | Flexural elasticity modulus [N/mm$^2$] | Flexural strength [N/mm$^2$] | Screw pullout resistance [N] | Peeling strength [N/mm$^2$] |
|---|---|---|---|---|---|---|---|---|---|
| 1 | a) | a) | — | 507 | 0.48 | 1520 | 7.4 | 620 | 0.7 |
| 2 | 0.075 | 0.075 | 1 | 503 | 0.63 | 1575 | 8.4 | 680 | 0.8 |
| 3 | 0.108 | 0.043 | 2.50 | 498 | 0.64 | 1575 | 8.6 | 750 | 1.1 |
| 4 | 0.043 | 0.108 | 0.40 | 502 | 0.75 | 1620 | 9.3 | 690 | 0.8 |

-continued

| Example | Ratio X ("exterior") | Ratio Y ("interior") | Ratio Z (=X:Y) | Density [kg/m$^3$] | Transverse tensile strength [N/mm$^2$] | Flexural elasticity modulus [N/mm$^2$] | Flexural strength [N/mm$^2$] | Screw pullout resistance [N] | Peeling strength [N/mm$^2$] |
|---|---|---|---|---|---|---|---|---|---|
| 5 | 0.086 | 0.065 | 1.33 | 495 | 0.62 | 1580 | 8.6 | 720 | 1.0 |
| 6 | 0.065 | 0.086 | 0.75 | 498 | 0.72 | 1605 | 9.1 | 680 | 0.8 |
| 7 | 0.081 | 0.070 | 1.15 | 499 | 0.64 | 1585 | 8.5 | 710 | 1.0 |
| 8 | 0.070 | 0.081 | 0.87 | 503 | 0.68 | 1600 | 8.8 | 680 | 0.8 | a) this comparative example contains no expanded plastics particles (component B)

The invention claimed is:

1. A process for producing a lignocellulosic material having a core and two outer layers, the process comprising:
    mixing constituent components of a core mixture, the constituent components of the core mixture including
        A) 30% to 98% by weight of lignocellulose particles;
        B) 1% to 25% by weight of expanded plastics particles having a bulk density in the range from 10 to 150 kg/m$^3$, and
        C) 1% to 50% by weight of one or more binders selected from the group consisting of aminoplast resin, phenoplast resin, and organic isocyanate having at least two isocyanate groups, to provide a core mixture;
    mixing constituent components of an outer layer mixture, the constituent components of the outer layer mixture including
        E) 70% to 99% by weight of lignocellulose particles, and
        F) 1% to 30% by weight of one or more binders selected from the group consisting of aminoplast resin, phenol-formaldehyde resin, and organic isocyanate having at least two isocyanate groups, to provide an outer layer mixture,
        G) 0% to 10% by weight of additives;
        wherein the lignocellulose particles of the outer layers comprise at least 25% by weight of lignocellulosic chips;
    depositing the outer layer mixture and the core mixture in the following order on a support; a first outer layer mixture, the core mixture, and a second outer layer mixture, to provide a mat composite construction on the support;
    compressing the mat composite; and
    curing the binders C) and F) by polycondensation; wherein the expanded plastics particles B) are nonuniformly distributed in the core such that that a weight ratio x (based on dry mass) of expanded plastics particles B) to lignocellulose particles A) in exterior regions of the core is different from the weight ratio y of expanded plastics particles B) to lignocellulose particles A) in an interior region of the core.

2. A process for producing the lignocellulosic material according to claim 1 which comprises mixing components E, F and G for the outer layers and components A, B, and C for the core, wherein the material for the core is scattered in such a way as to form a nonuniform mixture of components A and B.

3. The process according to claim 1, wherein the nonuniform mixture of components A and B is obtained by scattering different mixtures with different proportions of A to B in succession.

4. The process according to claim 1, wherein the nonuniform mixture of components A and B is obtained by separately scattering the mixture comprising A, B, and C.

5. The process according to claim 1, wherein the core further comprises D) up to 10% by weight additives.

6. The process according to claim 1, wherein the compressing of the mat composite is conducted at a temperature of 150° to 250° C., and a pressure of 5 to 30 bar.

7. The process according to claim 1, wherein the interior region of the core is separated from two exterior regions of the core along an interface that extends parallel to a facial plane of the composite mat.

8. The process according to claim 1, wherein the interior region of the core accounts for 40% to 60% by weight of the overall dry mass of the core, and is positioned between the two exterior regions of the core.

9. The process according to claim 8, wherein the mat composite having a dimensional area of 30×30 cm and a thickness of 16 mm has a transverse tensile strength of 0.62 to 0.75 N/mm$^2$ in accordance with EN 319, and a flexural elasticity modulus of 1575 to 1620 of N/mm$^2$ in accordance with DIN EN310.

10. The process according to claim 8, wherein the expanded plastics particles comprises polystyrene or a copolymer of styrene, and have a low residual, blowing agent content of 0.5% to 4% by weight, based on the overall mass of plastic and blowing agent.

11. The process according to claim 1, wherein the depositing of first outer layer mixture, the core mixture, and the second outer layer mixture includes separative scattering to facilitate the plastic particles accumulate either in the exterior region or in the interior region of the core, depending on the size by scattering the mixture including A, B, and C with screens of different hole sizes that are arranged mirror-symmetrically.

12. The process according to claim 1, wherein the compressing the mat composite includes cold precompaction prior to hot pressing.

* * * * *